No. 758,936. Patented May 3, 1904.

UNITED STATES PATENT OFFICE.

WILLIAM SANDERS, OF NORTH BIRMINGHAM, ALABAMA, ASSIGNOR TO WILLIAM J. RYAN, OF BIRMINGHAM, ALABAMA.

COMPOUND FOR COATING EGGS.

SPECIFICATION forming part of Letters Patent No. 758,936, dated May 3, 1904.

Application filed May 2, 1903. Renewed March 18, 1904. Serial No. 198,834. (No specimens.)

*To all whom it may concern:*

Be it known that I, WILLIAM SANDERS, a citizen of the United States, residing at North Birmingham, in the county of Jefferson and State of Alabama, have invented a new and useful Compound for Coating Eggs, of which the following is a specification.

This invention relates to a composition of matter, and has for its object to provide an improved compound for application to the shells of eggs to fill up the pores thereof and exclude air from the interior of the egg, thereby preserving the same without affecting the taste or quality of the egg and obviating the necessity of placing the eggs so treated in cold storage.

With this object in view the invention consists in a composition or compound of matter formed of the following ingredients in or about the proportions specified, to wit: water twelve ounces; powdered gum-acacia, three ounces; lime, one ounce, and zinc oxid one ounce.

In carrying out the invention the above-named ingredients are thoroughly mixed to form a semi-aqueous solution of substantially the consistency of soft butter, which is applied to the shell of the egg with a sponge, rag, or otherwise, filling up the pores of the shell and protecting the egg by forming an air-tight closure around it. The gum-acacia forms a paste, and the lime and zinc cause the coating to harden and keep the pores hermetically sealed, the zinc not only materially assisting in hardening the coat as it dries, but also tends to strengthen the shell and preserve the egg.

Having thus described my invention, what I claim is—

1. The herein-described preserving compound for coating eggs consisting of water, powdered gum-acacia, lime and zinc oxid in or about the proportions named.

2. The herein-described preserving compound for coating eggs comprising water twelve ounces, powdered gum-acacia, three ounces lime one ounce, and zinc oxid one ounce.

In testimony that I claim the foregoing as my own I have hereto affixed my signature in the presence of two witnesses.

WILLIAM SANDERS.

Witnesses:
C. N. OERIN,
JNO. A. WATFORD.